US005101474A

United States Patent [19]

Schlegel et al.

[11] Patent Number: 5,101,474

[45] Date of Patent: Mar. 31, 1992

[54] DIGITAL COMPUTER SYSTEM WITH ANALOG FEEDBACK FOR A PRINTING PRESS CONTROL

[75] Inventors: Christian Schlegel, Dreieich/Sprendlingen; Claus Walter, Glauburg, both of Fed. Rep. of Germany

[73] Assignee: MAN Roland Druckmaschinen AG, Fed. Rep. of Germany

[21] Appl. No.: 440,023

[22] Filed: Nov. 21, 1989

[30] Foreign Application Priority Data

Nov. 21, 1988 [DE] Fed. Rep. of Germany ....... 3839248

[51] Int. Cl.[5] ............ G06K 15/00

[52] U.S. Cl. ............ 395/114; 395/104; 395/109

[58] Field of Search ............ 364/518-520, 364/940.61, 940.62, 242.94, 242.95, 242.96, 830, 235, 551.01, 550, 579; 340/825.06, 825.07, 825.08

[56] References Cited

U.S. PATENT DOCUMENTS 4,517,637 5/1985 Cassell ............ 364/900

FOREIGN PATENT DOCUMENTS

3642500A1 12/1986 Fed. Rep. of Germany ...... 364/519

OTHER PUBLICATIONS

"Multifunktionssystem Ersetzt Acht Komplexe Messgerate", by Muhlenbroich Elektronik Information No. 11-1987, pp. 58-61.

*Primary Examiner*—Arthur G. Evans
*Attorney, Agent, or Firm*—Leydig, Voit & Mayer

[57] ABSTRACT

A control system for a printing press in which a central computer is interfaced to a plurality of printing units through peripheral units located near the press units. The central unit utilizes digital signals to address particular peripheral units and to select control functions at the selected peripheral unit. The controlled functions in the press units provide analog feedback signals which are to be sensed by the central computer. A multi-function bus comprising both analog and digital sections couples the central computer to the peripheral units. The integrity of the analog feedback signals on the bus is maintained by assuring that the digital signals on the bus are maintained in a quasi-steady condition during intervals when the central computer is evaluating analog feedback signals on the analog section of the bus.

12 Claims, 3 Drawing Sheets

DIGITAL COMPUTER SYSTEM WITH ANALOG FEEDBACK FOR A PRINTING PRESS CONTROL

FIELD OF THE INVENTION

This invention relates to printing presses, and more particularly to centralized control systems for printing press functions such as inking adjustments on a zone-by-zone basis, means for measuring or adjusting web tension, register adjusters and the like.

BACKGROUND OF THE INVENTION

Distributed computers are used in printing presses both for making adjustments and for measuring parameters which can be used as the basis for making adjustments, throughout the press. Such distributed computers often find use in rotary printing presses, and such presses are often broken down into press units which localize the control mechanisms and measuring transducers at the various units. Thus, it is possible to associate a computer with each unit, or alternatively, to allow a single computer to service multiple units. However, in either case, the stations to be controlled (and from which measurements are taken), e.g., the press units, are usually at a distance of several meters or more from the computer. The length of wire runs between the computing equipment on the one hand and the actuators or transducers on the other hand can tend to introduce noise and interference problems which can render measurements taken undesirably inaccurate. In addition to noise problems, there is also a wiring density problem which is often encountered in highly automated presses. For example, if the distributed computer is to control ink feed, it may have as many as 20 and perhaps up to 54 ink adjusters per printing unit, and each of those adjusters require separate control lines and a separate signal line for an associated transducer.

Thus, automation of multiple unit presses can give rise to substantial control problems, which can involve not only the long cable runs (which give rise to the possibility of interference, perhaps on a random and uncontrolled basis), but also the high density of cable runs which can exacerbate the interference problem. In addition, in many highly automated press systems, it is often required for measurements, adjustments and control operations to be performed very fast. As an example, there are certain closed loop systems which are utilized, (as well as other non-closed loop systems) which attempt to make small corrections but with sufficient rapidity to maintain printed accuracy to within a few percent. When it is considered that there are a large number of controllable actuators on such a press, that each of the actuators can have a feedback mechanism associated therewith, that all of the feedback mechanism need be monitored, and that any or all of the adjusters might need readjustment at any given time, it will be appreciated that the addressing, signalling, control and measurement problems can become quite complex and inter-related.

A number of partial solutions have been proposed in highly automated printing presses. Those have included the use of expensive shielded cable for particular signal and control lines. Such cable requires special terminators and often special workmen for installation and maintenance. Other approaches have been taken in both hardware and software in order to make more manageable the signalling and integrity of signalling problem in large highly automated press systems, but those systems have not always been adequately simple in implementation, inexpensive in cost, or reliable in operation.

SUMMARY OF THE INVENTION

In view of the foregoing, it is a general aim of the present invention to provide a digital computer system with analog feedback for a printing press control which utilizes a single multi-function bus for both analog and digital signals, but controls the respective analog and digital signals on the bus in such a way as to assure the integrity of the analog signals when they are measured.

According to one aspect of the invention, an object is to utilize a central computer system for controlling functions on a printing press, the computer operating on digital signals and also accepting analog signals from the printing press for measurement, the computer being interfaced to the press in such a way as to efficiently exchange signals between the central computer and peripheral units at the press units while assuring interference-free integrity of the analog signals.

Generally it is an aim of the present invention to provide a control system for a printing press which utilizes a central computer coupled to peripheral units at the press units, and which uses both analog and digital signals, but in such a way that the analog signals exchanged between the units are transmitted to the central computer with minimum interference.

In practicing the invention, there is provided a control system for controlling printing press functions at a plurality of printing units in a printing press. The printing press has electrical actuators for controlling the press functions and feedback means for providing analog feedback signals for the press functions. The control system includes a central computer for producing control signals and for receiving and processing feedback signals for control of the press functions. Peripheral units are located at the press units for interfacing between the central computer and the electrical actuators and feedback means on the press units. A multi-function bus extends from the central computer and is coupled to each of the peripheral units. The bus has an analog section and a digital section so that both analog and digital information are exchanged on the bus between the central computer and the peripheral units. The system includes means for addressing, via the digital section of the bus, a selected one of the peripheral units for exchange of signals between it and the central computer. Means in the central computer provides for receipt of analog feedback signals on the analog section of the bus from a selected peripheral unit. Interference suppression means assures that such signals are received for analysis only when the signals on the digital section of the bus are maintained in a steady condition.

It is a feature of the invention that the central computer and peripheral units exchange both analog and digital signals, but such exchange is on different portions of the bus, and furthermore the digital portion of the bus is maintained in a steady state condition at a time when analog information is actually being exchanged.

An advantage of the invention resides in the fact that a large number of peripheral units can be addressed and control instructions, such as for adjustments of ink feed, transmitted to the peripheral units while the analog signals detected in the peripheral unit can also be supplied to the central computer and evaluated with great accuracy. In other words, both the adjusting drive mechanisms and the means for detecting the measured values in the peripheral unit are triggered by way of the multi-function analog/digital bus in accordance with the invention. Address and data or control instructions are transmitted over the digital part of the bus, and analog values which must be detected in the peripheral units and evaluated in the central computer are transmitted over the analog part of the multi-function bus. While address recognition and processing of control instructions is performed in the peripheral unit, the central computer assures that any digital signals on the digital section of the bus are maintained in a steady state pre-existing condition whenever it is desired that the central computer make a measurement of the analog information on the analog section of the multi-function bus.

Other objects and advantages will become apparent from the following detailed description when taken in conjunction with the drawings, in which:

Figure 1B:
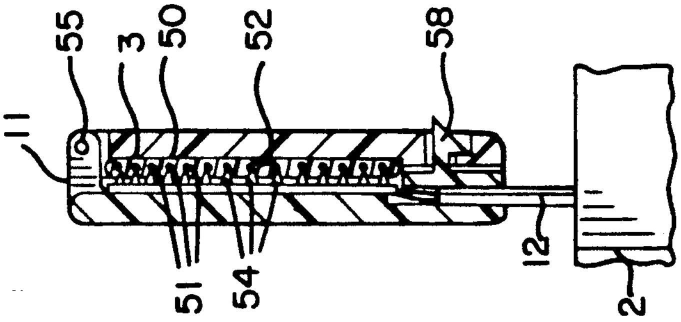
FIG. 1*b* is a cross-sectional view (taken along the line 1*b*—1*b* of FIG. 1*a*) of the system of FIG. 1*a* showing one of the peripheral unit connectors coupled to the multi-function bus.

While the invention will be described in connection with a certain preferred embodiment, there is no intent to limit it to that embodiment. On the contrary, the intent is to cover all alternatives, modifications and equivalents included within the spirit and scope of the invention as defined by the appended claims.

DETAILED DESCRIPTION OF THE PREFERRED EMBODIMENTS

The printing press to be controlled in accordance with the invention is preferably a rotary press, usually reel-fed but also possibly a sheet-fed press. As noted above, highly automated varieties of such presses have evolved, and such highly automated presses provide the operator a centralized means of controlling the respective printing units, and usually also provide some mechanism for producing data at a centralized location indicative of the print quality then being produced.

In presses of that type, numerous control systems, many of them with analog feedback, are utilized. An important example are the ink adjusters which are present in each inking unit for each of the printing units. A plurality of ink adjusters are disposed across a fountain, and each adjuster is responsive to an electrical control signal for moving in the plus or minus direction which establishes a relative position with respect to a ductor roller. The relative position controls the ink film thickness in that particular segment of the fountain, and thus is a direct control of printed density of the product in that control zone. Adjustment away from the ductor roller makes the ink film thickness greater, and adjustment toward the ductor makes the ink film thickness less, both with the expected result on printed density. In highly automated presses, each of the adjusters has a position feedback sensor, such as a potentiometer, which produces an analog signal indicative of the adjuster setting. Other control units which utilize electrical actuators and may or may not include electrical analog feedback devices include register controls, web tension controls, dampener controls, and the like. Usually, a group of such units can be associated with each printing couple. For example, it is a simple matter to identify the fountains in a particular printing unit as containing the ink adjusters relative to that unit. Similarly, while a compensator might be located nearer one unit than the other, it can be assigned to either unit for convenience. In any event, it is possible to use some logical basis to divide the press units one from the other and thus segregate the electrical controls and feedback elements as related to the particular press units. When that concept is referred to in this specification, it does not necessarily require association of a particular control with the physically closest printing unit, or that a control station might not be related to a particular printing unit at all, but the concept of printing unit division of controls is simply intended to encompass some logical means of separating groups of controls within the printing line.

Figure 1A:
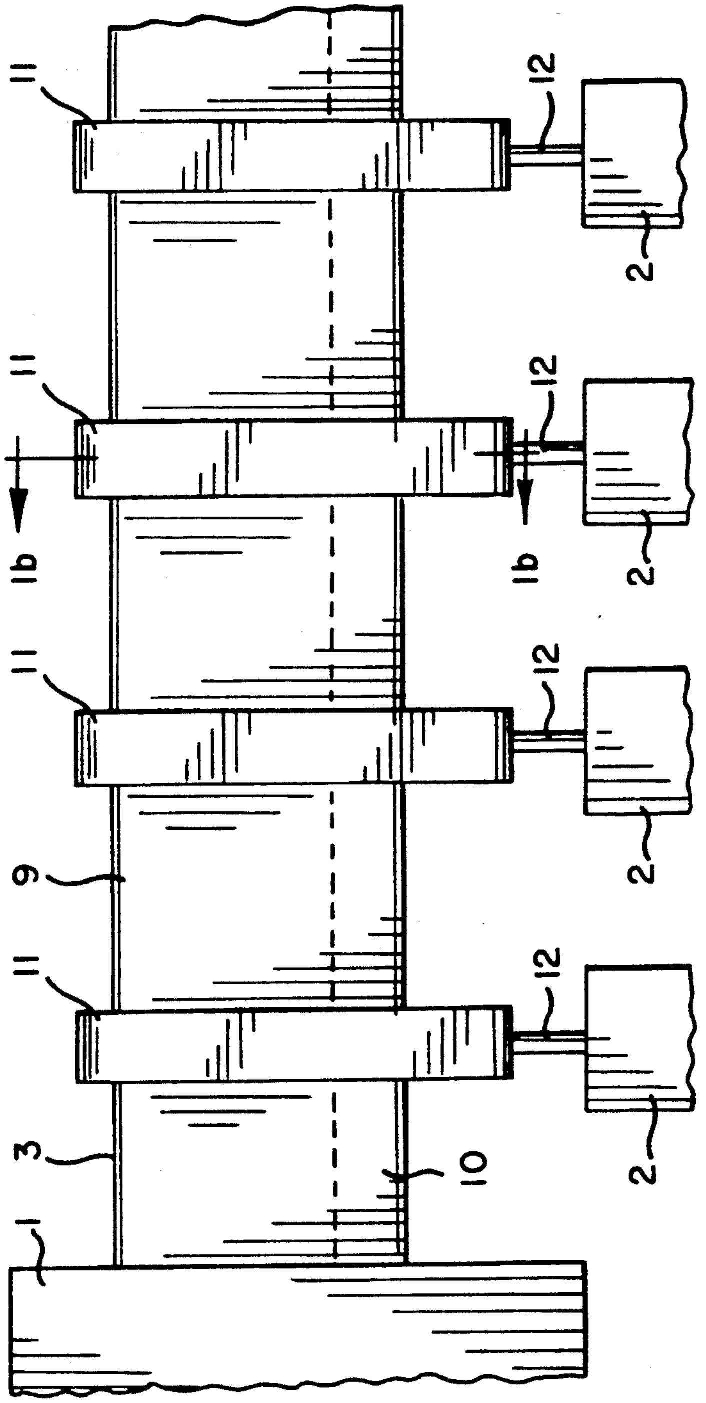
FIG. 1*a* is a diagrammatic overview showing a central computer according to the invention coupled by way of a multi-function analog/digital bus to a plurality of peripheral units.

Turning then to FIG. 1*a*, there is shown a control system exemplifying the present invention with a central computer 1 adapted for communication with a plurality of peripheral units 2, each of the peripheral units 2 being adapted to service a group of electrical adjusters and associated feedback mechanisms on a press, such groups preferably being divided on a per unit basis.

As a feature of the invention, a multi-function bus 3 in the form of a ribbon cable extends from the central computer 1 and is connected to each of the peripheral units 2. The term "bus" when used herein is understood to mean a collection of a number of electrical lines which extend to more than two stations from a central station, each station having controlled access to the various lines of the bus.

The bus 3, in carrying out the invention, is divided into two sections, a digital section 9 and an analog section 10. As will be described in greater detail below, those parts, particularly the digital part 9, are broken down into further sections. Simply appreciating at this point that the multi-function bus 3 comprises a digital section 9 and an analog section 10 is sufficient. As shown in FIG. 1*a*, the bus 3 is connected to each of the peripheral units 2 by means of a plug-in connector 11. It is recalled that the bus 3 is preferably formed of ribbon cable, and thus the connector 11 encompasses the cable and forms individual connections to the conductors therein as best illustrated in cross section in FIG. 1*b*. There is shown the connector 11 and the cable 3 encompassed therewithin. The bus 3 is shown in the form of a ribbon cable 50 having a plurality of spaced conductors 51 therein. The ribbon cable is clamped securely within an aperture 52 centrally located in the connector 11. Contact means 54 are used to pierce the ribbon cable 50 in order to make individual connections to the conductors 51 within the ribbon cable. As is conventional, the connector 11 can be pivoted about a point generally indicated at 55 to allow insertion of the ribbon cable 50 within the slot 52, then closure of the connector about the pivot point 55 to cause contact between the connectors 54 and the conductors 51. A clamp 58 serves to maintain the connector 11 in the locked condition. The connectors 54 are coupled to an internal cable 12 which serves as a connecting means between the multi-function bus 3 and peripheral units 2.

As a result of that construction, an extended length of multi-function bus 3 can simply extend from central computer 1 toward the press units, and individual peripheral units 2 can be connected to the bus 3 at any desired location simply by installing a connector 11 about the ribbon cable 50 at a desired point. As will become more apparent from the following description, once electrical connection is made to a particular peripheral unit 2, addressing signals generated in the central computer 1 can selectively activate the peripheral units for allowing communication between the central computer 1 and the control elements connected to the selected peripheral unit.

Figure 2:
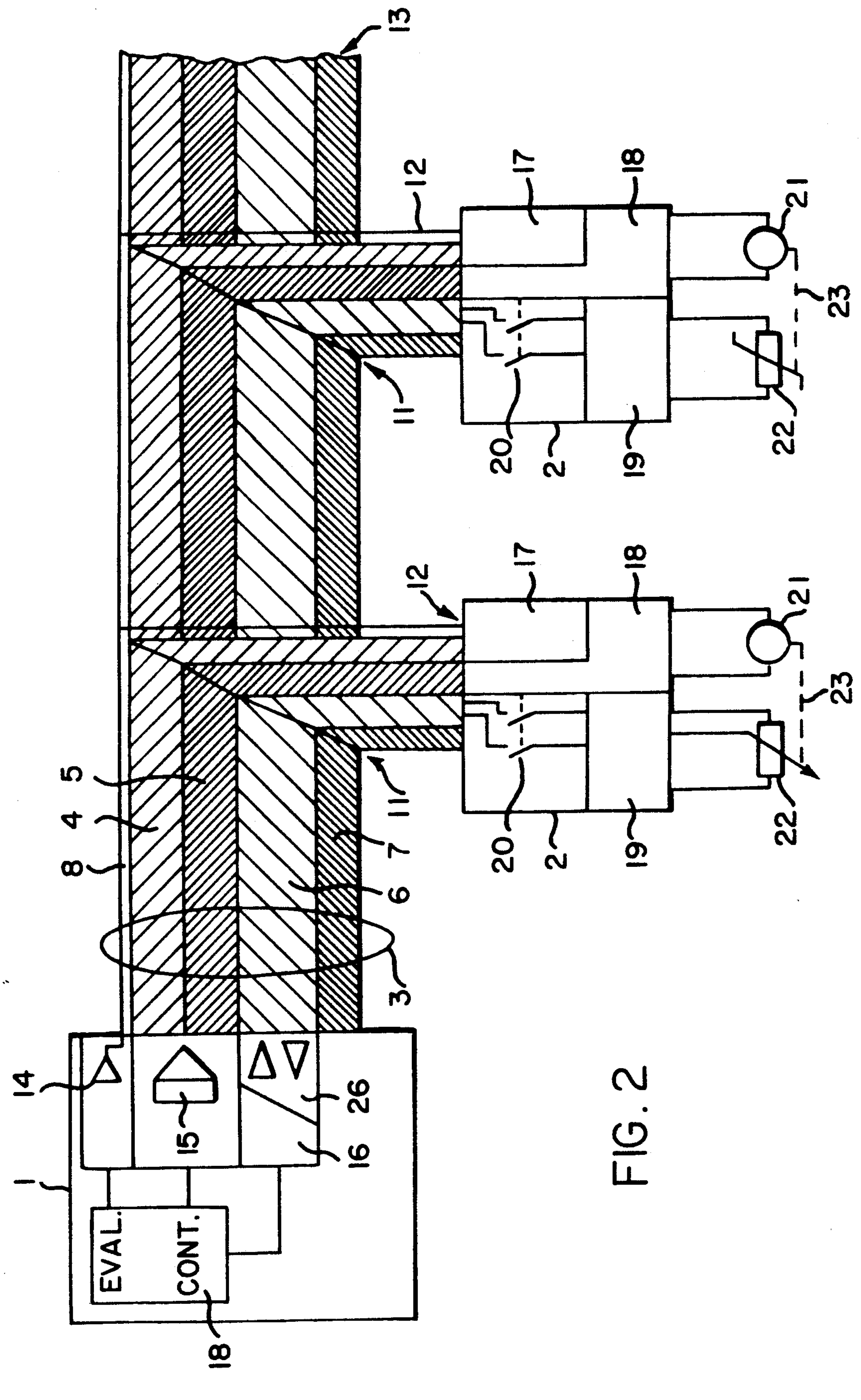
FIG. 2 is a view of a system according to the invention shown in greater detail than the diagram of FIG. 1*a*.
Figure 3:
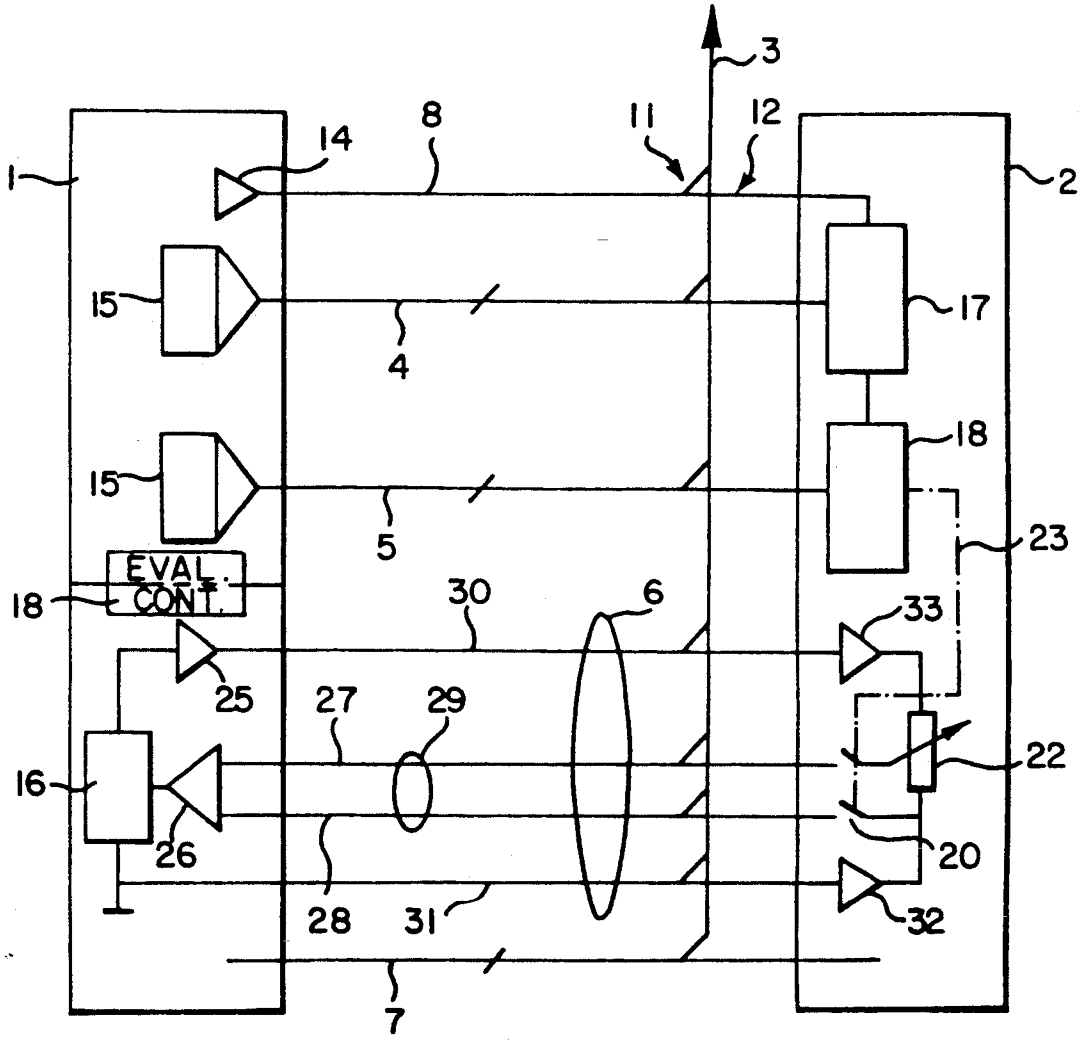
FIG. 3 illustrates the wiring between the central computer and a peripheral unit, such wiring being carried in the multi-function bus of FIGS. 1*a* and 2.

Additional details of the construction and operation of the invention will be described in connection with FIGS. 2 and 3. FIG. 2 best illustrates the bus structure and its relationship to the central computer 1 and the peripheral units 2. FIG. 3 is in the form of a wiring diagram better illustrating the connections between the central computer 1 and one of the peripheral units 2. The following description can be read in connection with both figures and, in the event a particular element of the description is more relevant to one figure than the other, mention will be made below.

The drawings, particularly FIG. 2, show the further breakdown of the multi-function bus 3 including subdivision of the digital portion 9 into an address sub-section 4, and a control sub-section 5. A write line 8 is associated with the digital sections 4, 5. The analog section 10 of the multi-function bus 3 is shown in FIGS. 2 and 3 as comprising the analog section 6. FIGS. 2 and 3 also show a power supply section 7 of the bus which can be considered part of the analog section, part of the digital section, or a completely separate section as desired.

In the practice of the invention, address signals are transmitted on the address section 4 of the bus in the form of digital signals, and are transmitted simultaneously to all of the peripheral units 2 connected to the bus. The central computer 1 preferably has a series of latched digital bus drivers 15 adapted to drive the bus with digital signals of the appropriate levels. The control bus 5 is also a multi-conductor bus and like the data bus 4 also has a series of latched digital bus drivers 15 for controlling the digital levels thereon. The latches 15 are important in practicing the aspect of the invention which requires quiescence on the digital bus during the time that analog signals on the analog section are being measured. They can be considered one form of interference suppression means, as that term is used herein. The digital latches 15 can thus be latched to address a particular peripheral unit and a particular function in that peripheral unit, then those latched signals left on the bus until the central computer 1 completes taking a sample of the analog signals being returned from the selected peripheral unit. In other words, the address forming digital data as well as any control data needed are all latched before transmission of analog signals over the analog section 6 of the bus from the selected peripheral unit 2 to the central computer 1, i.e., the digital signals are maintained on the line with their voltage levels unaltered. The time between the last change in digital signals and the instant when the central computer 1 can measure analog signals on the analog section is a function of line length, cable material, and other physical parameters of the units in question. Suffice it to say that a suitable time delay is easily determined and implemented in the central processor 1, and the central processor 1 thereupon uses an evaluation control circuit 18 to assure that the digital signals are quiescent for that predetermined time interval before signals on the analog section 6 are sensed for measurement.

Continuing the focus on the digital aspects of the control and peripheral units, it is seen that each peripheral unit 2 comprises an address recognition circuit 17 which is programmed with its own address data and recognizes a similar data pattern on the data section 4 of the multi-function bus 3. Upon recognition of its own address, the address recognition circuit 17 produces a signal which is coupled to a control instruction processing circuit 18 to enable the latter. It is seen in FIG. 3 that the address recognition circuit 17 has two inputs, the multi-line bus 4 which carries address signals, and a write signal on line 8 which emanates from a driver circuit 14 in the central computer 1, and causes the strobing of address recognition circuit 17. Thus, when the central processor 1 desires to address a particular peripheral unit 2, it first couples the appropriate address data on bus section 4, and such address signals appear at all peripheral units. After stabilizing the address signals on the bus section 4, a write signal is coupled to line 8 of the multi-function bus to strobe the address recognition circuits 17 in each of the peripheral units 2. Only the circuit 17 which recognizes its own address will be activated and will respond by coupling a signal to control instruction processing circuit 17 of the selected peripheral unit 2. All of the other peripheral units 2 will remain quiescent since they have not sensed their own address. In other words, the activated address recognition circuit 17 in the selected peripheral unit 2 conditions the associated control instruction address processing circuit 18 to respond to digital signals then on the control section 5 of the bus (which had been produced in central computer 1 and latched by means of latches 15 onto the bus section 5). The peripheral unit 2, and particularly the control register 18 portion thereof, receives and latches such signals to drive associated adjustment or control mechanisms in the associated printing unit in accordance with the instructions received from the central computer 1.

For example, inking zone servo motors 21 (see FIG. 2) are among the elements connected to the control instruction processing circuit 18, and one or more of such servo motors 21 can be selected by the central computer 1 for adjustment in an increase or decrease direction. The servo motors 21, in addition to being connected for driving the ink adjustment mechanism, are also connected by means of adjusting mechanism 23 to a feedback potentiometer 22 which provides a signal relating to the actual position of the ink adjustment mechanism. (It will be apparent that the ink adjustment illustration is merely exemplary of the numerous forms of electrical control and feedback signalling elements in a printing press which can be controlled from a central computer unit.)

In summary, it has now been demonstrated that the control bus 3 has multiple sections which provide for digital selection and control of individual functions within each of the printing units associated with the respective peripheral units 2. Address signals are coupled on an address section 4 and written into an address recognition circuit 17 of a selected peripheral unit 2. That action enables the instruction processing circuit 18 of the selected peripheral unit, and that unit responds to digital signals on a control signal bus 5 to select one of many control functions, such as one of many ink adjustment servo motors 21 for positioning in one direction or the other. The control signals cause the adjustment, and the mechanical coupling between the positioning mechanism and a feedback potentiometer 22 produces control signals which serve to indicate the actual adjusted position of the controlled element.

In accordance with the invention, the bus 3 also provides an analog section 6 for conveying actual feedback signals from the controlled elements back to the central computer 1, and doing so in a manner which allows simplification of the bus while assuring the integrity of the coupled signals. To that end, the feedback signals from potentiometer 22 are coupled through a preprocessing or buffer circuit 19 (which may be in the form of an absolute value circuit, for example), and through a pair of controllable switches 20 to the analog section 6 of the multi-function bus 3). Control of the switches 20 is by means of the central computer 1 which, as described above, couples address signals to the address section 4 and control signals to the control section 5, followed by a write signal on the write bus 8. The selected control circuit 18 in the selected peripheral unit 2 then operates through control line 23*a* (see FIG. 3) to close a selected pair of switches 20 and thereby couple the selected analog feedback signal onto the analog section 6 of the bus 3 for sensing by the central computer 1. The evaluation control circuit 18 in the central computer may be utilized, if desired, to assure the timing between the imposition of the digital signals on the digital sections 4, 5, 8 is adequately spaced from sensing of the analog signals on the section 6 to assure that the former are quiescent so as not to affect the latter. Alternatively, a separate evaluation control element 18 (normally a software element in any event) can be dispensed with since the the central computer 1 controls both the coupling of the digital signals to the bus as well as the closing of the switches 20 by means of the aforementioned digital signals coupled to the bus.

In any event, the so-called "latching-in" of addresses and data (for example, by means of the latching drivers 15), insures that even when the bus 3 is very long, the digital signals have reached a steady state (i.e., a quasi-steady voltage state exists on bus 3) in the digital section before the analog section is read.

According to the invention, after an address has been recognized in a particular peripheral unit 2, the transmission of analog signals therefrom to the central computer 1 can proceed only after the digital signals have reached a quasi-steady state so that the digital signals cannot falsify the analog measurement results on the bus 3, for example, by cross-coupled voltage peaks induced by the rising or trailing edges of the digital signals, by reflections or the like. According to the invention, when using latches 15 in the digital sections of the bus, transients in the form of level variations in the digital sections are prevented, and therefore the possibility of coupling such transients into the analog bus 6 are completely avoided.

The quiescent state of the digital lines can best be appreciated with reference to FIG. 3. First of all, when it is desired to select a particular feedback element for providing an analog signal for sensing at the central computer 1, the appropriate digital address and control signals are coupled onto digital sections 4, 5 and thus are present at circuits 17, 18 in all of the peripheral units. Only after those signals have reached a steady state is a write signal coupled onto line 8 by means of driver 14, and the circuits 17, 18 in the selected peripheral unit 2 thereupon react, well after those digital levels are in the steady state, by closing the selected set of switches 20 and only then coupling the selected analog signal to the analog section 6 of the multi-function bus 3.

A further feature, important with respect to certain embodiments of the invention, is the fact that analog signals are transmitted differentially, i.e., by two lines 27, 28 (see FIG. 3), always used together as indicated by reference numeral 29 for the transmission of voltages tapped off the potentiometer 22. The tapped voltages are fed to a difference amplifier 26 in the central computer 1 which detects the analog signal to be measured as a difference between the two voltages, and thereupon supplies a measure of the difference to an analog-to-digital converter 16. Thereafter, the digitized difference signal is evaluated in the central computer 1. Evaluation of that signal can be in a conventional fashion and may result, for example, in readjustment of one or more actuators associated with the selected peripheral unit. The adjustment is then carried out by means of digital addresses and control data coupled onto the digital portions 4, 5 of the bus in a manner which will now be apparent. There is thus obtained for each peripheral unit 2 an individual reference point for each measurement, thus reducing errors due to voltage drops and radiated interference.

In addition, the power supply in the peripheral units 2 for the feedback potentiometers, such as potentiometer 22, is, with advantage, taken from the computer 1 by way of two analog reference lines 30, 31. Those reference lines are buffered and decoupled in the peripheral unit 2 and computer 1 by buffer circuits 25, 32, 33. The line 30 typically carries the positive reference signal coming from the output of the analog-to-digital converter 16, and the line 31 carries the zero volt or reference signal. This feature of coupling the power supply used for the analog-to-digital converter to each peripheral unit leads to great reproducibility in the measurements since variations of the reference voltage are not included in the measurement.

Advantageously, all of the analog lines, i.e., lines 27, 28, 30, 31, comprising the analog bus 6 are terminated in a high impedance manner by the buffers 32, 33 in the peripheral unit 2 and by the difference amplifier 26 in the central computer 1. Thus, there is virtually no loading on the analog section 6 by virtue of the high impedance buffers, and little interference coupling by manner of the construction described thus far, and thus the analog signals 6 should very accurately reflect the positions of the associated elements being controlled in the press units.

It will therefore be appreciated that what has been provided is a new and improved control system for controlling press functions in a printing press. A central computer is the main element for exerting control and exerts control over a plurality of peripheral units by means of digital address section and a digital control section in a multi-function bus. The multi-function bus also has an analog section for returning feedback signals to the central computer. While the multi-function bus carries both digital information (address and control) as well as analog feedback information, there is no need for shielding of any line or group of lines in the bus from any other line or group of lines. The central computer controls the peripheral units in such a way as to couple analog signals onto the analog section of the bus for analysis by the central computer only after the digital signals on the bus have well stabilized so as to assure that the analog signals on the bus are free of interference caused by transients in the digital signals. Greater accuracy and reliability is thus provided.

What is claimed is:

1. A control system for controlling press functions at a plurality of printing units in a printing press, the press units having electrical actuators for controlling the press functions and feedback means for providing analog feedback signals for the press functions, the control system comprising in combination:

a central computer for producing control signals and for receiving and processing feedback signals for control of the press functions, peripheral units at the press units for interfacing between the central computer and the electrical actuators and feedback means in the press units, a multi-function bus extending from the central computer and coupled to each of the peripheral units, the bus having an analog section and a digital section for exchange of analog and digital signals between the central computer and the peripheral units, means for coupling digital signals to the digital section of the multi-function bus for addressing a selected one of the peripheral units and for exchange of digital signals between the central computer and the selected peripheral unit, means in the central computer for receiving analog feedback signals from the selected peripheral unit on the analog section of the bus, and interference suppression means including latches for the digital signals for maintaining a quasi-steady state of the digital signals on the digital section of the bus for a time during which the analog feedback signals are received from the analog section of the bus.

2. The combination as set forth in claim 1 wherein the interference suppression means comprises latch means in the central computer for preventing the changing of signals in the digital section of the bus during the time the central computer is receiving analog feedback signals on the analog section of the bus from the selected peripheral unit.

3. The combination as set forth in claim 1 wherein the interference suppression means comprises means for assuring that the signals in the digital section of the bus have assumed a quasi-steady state before evaluating the magnitude of the analog signals transmitted on the analog section of the bus.

4. The combination as set forth in claim 1 further including analog power supply signals from which the analog feedback signals are tapped, the analog section of the multi-function bus being adapted to carry both the analog power supply signals and the analog feedback signals.

5. The combination as set forth in claim 4 in which the analog power supply signals comprise two power supply lines disposed on either side of the lines carrying the analog feedback signals.

6. The combination as set forth in claim 3 wherein each peripheral unit comprises switch means for coupling the analog feedback signals to the analog section of the bus, address recognition circuit means and control circuit means responsive to digital signals coupled on the digital section of the bus, and a write signal coupled to the address recognition and control circuit means for causing the closure of only the switch means associated with the peripheral circuit selected by the address and control signals on the digital section of the bus.

7. The combination as set forth in claim 6 wherein coupling of the write signal to the peripheral unit is accomplished after the digital address and control signals are latched on the digital section of the line, thereby to assure that the digital signals are transient-free prior to closure of the associated switch means.

8. The combination as set forth in claim 3 further including a difference amplifier at the central computer connected to receive the analog feedback signal.

9. The combination as set forth in claim 8 wherein an analog-to-digital converter is coupled to receive the output of the difference amplifier, the analog-to-digital converter having a reference voltage supply, and means coupling the reference voltage supply to the analog section of the bus for supplying a reference voltage to the feedback means thereby to provide a predetermined reference voltage from which the analog feedback signal is tapped.

10. The combination as set forth in claim 3 in which the multi-function bus comprises a ribbon cable, and the peripheral units are connected to the bus by means of ribbon cable snap connectors.

11. The combination as set forth in claim 3 wherein the digital section of the multi-function bus comprises a digital address section and a digital control section, a write control line connected to strobe address and control informations into the peripheral units under the control of the central computer, the analog section of the multi-function bus comprising an analog section adapted to receive signals after the address and control information is written into a selected peripheral unit by means of the write signal.

12. A method of controlling a printing press from a central computer, the printing press having a plurality of press units, each having electrical actuators for controlling the press functions and feedback means for providing analog feedback signals indicative of the press functions, the method comprising the steps of:

providing a plurality of peripheral units, one for each of the press units, interfacing between the central computer and the electrical actuators and feedback means in the press units, connecting the peripheral units to the central computer by means of a multi-function bus extending from the central computer and coupled to each of the peripheral units, segregating the multi-function bus into a digital section for carrying digital signals and an analog section for carrying analog signals including analog feedback signals originating in the press units to the central computer, coupling and latching digital signals from the central computer onto the multi-function bus to address a particular peripheral unit and provide control signals to the selected peripheral unit commanding the coupling of an analog signal onto the analog section for sensing by the central computer, and assuring that the digital signals are in a quasi-steady state before reading the analog feedback signal from the analog section at the central computer.

* * * * *